United States Patent
Matsunaga et al.

(10) Patent No.: US 8,848,300 B2
(45) Date of Patent: Sep. 30, 2014

(54) VEHICLE LAMP

(75) Inventors: Chiharu Matsunaga, Shizuoka (JP); Hiroyuki Kageyama, Shizuoka (JP); Tetsuaki Inaba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1309 days.

(21) Appl. No.: 12/101,654

(22) Filed: Apr. 11, 2008

(65) Prior Publication Data

US 2008/0253000 A1    Oct. 16, 2008

(30) Foreign Application Priority Data

Apr. 13, 2007   (JP) .................. 2007-106383

(51) Int. Cl.
| G02B 7/02 | (2006.01) |
| B29C 65/16 | (2006.01) |
| B29C 65/00 | (2006.01) |
| F21S 8/10 | (2006.01) |
| B29L 31/30 | (2006.01) |
| B29C 65/78 | (2006.01) |
| B29C 65/02 | (2006.01) |
| B29L 11/00 | (2006.01) |
| F21Y 101/02 | (2006.01) |
| B29K 33/00 | (2006.01) |
| B29K 69/00 | (2006.01) |
| B29L 31/00 | (2006.01) |

(52) U.S. Cl.
CPC .............. *B29C 65/16* (2013.01); *F21S 48/10* (2013.01); *B29L 2031/30* (2013.01); *B29C 66/348* (2013.01); *B29C 65/7814* (2013.01); *F21S 48/1216* (2013.01); *B29C 66/21* (2013.01); *B29C 65/02* (2013.01); *B29C 66/90* (2013.01); *B29C 65/1677* (2013.01); *B29C 65/1635* (2013.01); *B29L 2011/0016* (2013.01); *F21Y 2101/02* (2013.01); *B29C 66/542* (2013.01); *B29C 65/1661* (2013.01); *B29K 2033/12* (2013.01); *B29K 2069/00* (2013.01); *F21S 48/1335* (2013.01); *B29C 65/1674* (2013.01); *B29L 2031/747* (2013.01); *B29C 66/534* (2013.01)
USPC ......................................................... 359/819

(58) Field of Classification Search
USPC ......................................................... 359/819
See application file for complete search history.

(56) References Cited

U.S. PATENT DOCUMENTS

| 6,054,072 A | 4/2000 | Bentley et al. |
| 2005/0122735 A1 | 6/2005 | Watanabe et al. |

(Continued)

FOREIGN PATENT DOCUMENTS

| DE | 4042052 A1 | 11/1991 |
| JP | 2005-339873 | 12/2005 |
| WO | 03004211 A2 | 1/2003 |

OTHER PUBLICATIONS

Office Action in corresponding German Ppplication No. 10 2008 018 478.0 dated May 27, 2013 (10 Pages With English Translation).

*Primary Examiner* — Joseph P Martinez

(74) *Attorney, Agent, or Firm* — Osha Liang LLP

(57) ABSTRACT

A vehicle lamp includes a lens formed from a resin material and a lens holding member for holding the lens formed from the resin material. The lens and the lens holding member are adapted to be joined together through laser welding. A joining annular portion is provided on the lens holding member to which an outer circumferential portion of the lens is joined. A plurality of welding portions and a plurality of stopper portions are provided on the joining annular portion. The plurality of welding portions project towards the lens and are positioned apart from each other in a circumferential direction. The plurality of stopper portions project towards the lens, are positioned apart from each other in the circumferential direction, and contact the outer circumferential portion of the lens when the lens is joined to the joining annular portion.

20 Claims, 7 Drawing Sheets

(56) References Cited

U.S. PATENT DOCUMENTS

| | | | |
|---|---|---|---|
| 2005/0225991 A1* | 10/2005 | Yamazaki et al. | 362/362 |
| 2005/0243443 A1* | 11/2005 | Yamamoto et al. | 359/819 |
| 2005/0266762 A1 | 12/2005 | Yasuda et al. | |
| 2005/0270668 A1* | 12/2005 | Seita | 359/811 |
| 2005/0284851 A1* | 12/2005 | Enoki et al. | 219/121.64 |
| 2007/0076305 A1* | 4/2007 | Kuroda et al. | 359/726 |
| 2007/0146905 A1* | 6/2007 | Kuroda | 359/811 |

\* cited by examiner

VEHICLE LAMP

BACKGROUND OF INVENTION

1. Field of the Invention

The present invention relates to a vehicle lamp, and more particularly to increasing the positioning accuracy between a lens and a lens holding member, which are joined together through laser welding, by providing pluralities of welding portions and stopper portions on the lens holding member in such a manner as to project towards the lens.

2. Background Art

In some of vehicle lamps, a lens and a lens holding member, such as a lamp body which holds the lens, are joined together through laser welding. Specifically, a joining annular portion is provided on the lens holding member to which an outer circumferential portion of the lens is joined, so that the joining annular portion of the lens holding member and the whole (the full circumference) of the outer circumferential portion of the lens are joined together through laser welding.

When the outer circumferential portion of the lens and the joining annular portion are joined together along the full circumference through laser welding in the manner described above, the time taken for the welding work is extended in proportion to the laser welding joining being carried out along the full circumference of the outer circumferential portion of the lens and the joining annular portion and, due to the long working time, a variation in setting time depending upon portions on the outer circumferential portion of the lens and the joining annular portion occurs. This leads to the generation of strain between the lens and the annular joining portion. In addition, although high flatness is required for respective joining surfaces of the lens and the joining annular portion due to the outer circumferential portion of the lens and the joining annular portion being joined together along the full circumference thereof strain is generated in the lens and the joining annular portion depending upon the accuracy of the flatness. Thus, the positioning accuracy between the two components may become deteriorated.

There are vehicle lamps in which an outer circumferential portion of a lens and a joining annular portion are partially joined together through laser welding (for example, refer to Patent Document No. 1).

[Patent Document No. 1] JP-A-2005-339873

In the vehicle lamp described in Patent Document No. 1 above, because the laser welding is performed partially in such a state that the whole (the full circumference) of the outer circumferential portion of the lens and the whole (the full circumference) of the joining annular portion are in surface contact with each other, high flatness is required for respective joining surfaces of the lens and the lens holding member.

Consequently, it is not possible to eliminate the reduction in positioning accuracy between the lens and the joining annular portion due to the generation of stain based on the accuracy of the flatness.

Accordingly, a high accuracy control is required with respect to the lens and the lens holding member, causing the production costs of the vehicle lamp to be increased greatly.

SUMMARY OF INVENTION

According to one or more embodiments of the invention, there is provided a vehicle lamp wherein a joining annular portion is provided on a lens holding member to which an outer circumferential portion of a lens is joined, and wherein a plurality of welding portions and a plurality of stopper portions are provided on the joining annular portion, the plurality of welding portions project towards the lens and are positioned apart from each other in a circumferential direction, the plurality of stopper portions project towards the lens, are positioned apart from each other in the circumferential direction, and contact the outer circumferential portion of the lens when the lens is joined to the joining annular portion.

Consequently, in one or more embodiments of the vehicle lamp of the invention, although the welding is started in such a state that the lens is not brought into contact with the stopper portions, the lens is joined together with the lens holding member in such a state that only the joining portions and the stopper portions are joined to the lens.

Specifically, according to a first aspect of one or more embodiments of the invention, there is provided a vehicle lamp including a lens formed from a resin material and a lens holding member for holding the lens formed from the resin material, the lens and the lens holding member being joined together through laser welding, wherein a joining annular portion is provided on the lens holding member to which an outer circumferential portion of the lens is joined, and wherein a plurality of welding portions and a plurality of stopper portions are provided on the joining annular portion, the plurality of welding portions project towards the lens and are positioned apart from each other in a circumferential direction, the plurality of stopper portions project towards the lens, are positioned apart from each other in the circumferential direction, and contact the outer circumferential portion of the lens when the lens is joined to the joining annular portion.

Consequently, the working time in the laser welding operation of joining together the lens and the lens holding member can be shortened by carrying out welding only on the welding portions and, additionally, because the lens and the lens holding member are joined together in such a state that the lens sinks towards the lens holding member side to be in contact with the stopper portions, an increase in positioning accuracy between the lens and the lens holding member can be realized.

According to a second aspect of one or more embodiments of the invention, because the welding portions and the stopper portions of the lens holding member are provided alternately and spaced apart from each other in a circumferential direction, an increase in positioning accuracy between the lens and the lens holding member in the circumferential direction can be realized. Thus, it is possible to secure a good light distribution pattern of light emitted from a light source.

According to a third aspect of one or more embodiments of the invention, because welding surfaces are formed on the welding portions of the lens holding member in such a manner as to face the lens so as to be joined to the lens and a laser beam is made to be shone onto the welding portions excluding at least part of circumferential portions thereof, unnecessary melting of the lens holding member and the lens can be prevented.

According to a fourth aspect of one or more embodiments of the invention, a recess portion is formed on a side of the joining annular portion which faces a gate mark. The gate mark was formed on the lens as a mark of a gate which constituted a filling port from which molten resin was poured when the lens was molded. Thus, contact of the gate mark with the joining annular portion can be prevented and good positioning accuracy between the lens and the lens holding member can be secured.

According to a fifth aspect of one or more embodiments of the invention, because welding portions are also provided, respectively, near positions lying on both sides of the recess in the circumferential direction of the joining annular portion, the gate mark is drawn by the welding portions welded to both sides thereof and, even in the event that the temperature within the lamp rises, the deformation of the gate mark can be prevented.

Other aspects and advantages of the invention will be apparent from the following description, the drawings and the claims.

BRIEF DESCRIPTION OF DRAWINGS

FIG. 1 is a schematic sectional view of a vehicle lamp.

DETAILED DESCRIPTION

Hereinafter, a vehicle lamp in accordance with embodiments of the invention will be described by reference to the accompanying drawings. In the embodiments of the invention described below, a vehicle lamp is applied to a vehicle headlamp. However, note that the applicability of the vehicle lamp of the invention is not limited to the vehicle headlamp, but can be applied to various types of vehicle lamps mounted on a vehicle body.

A vehicle headlamp 1 is mounted to be disposed at left and right end portions on a front end part of a vehicle body.

Figure 1:
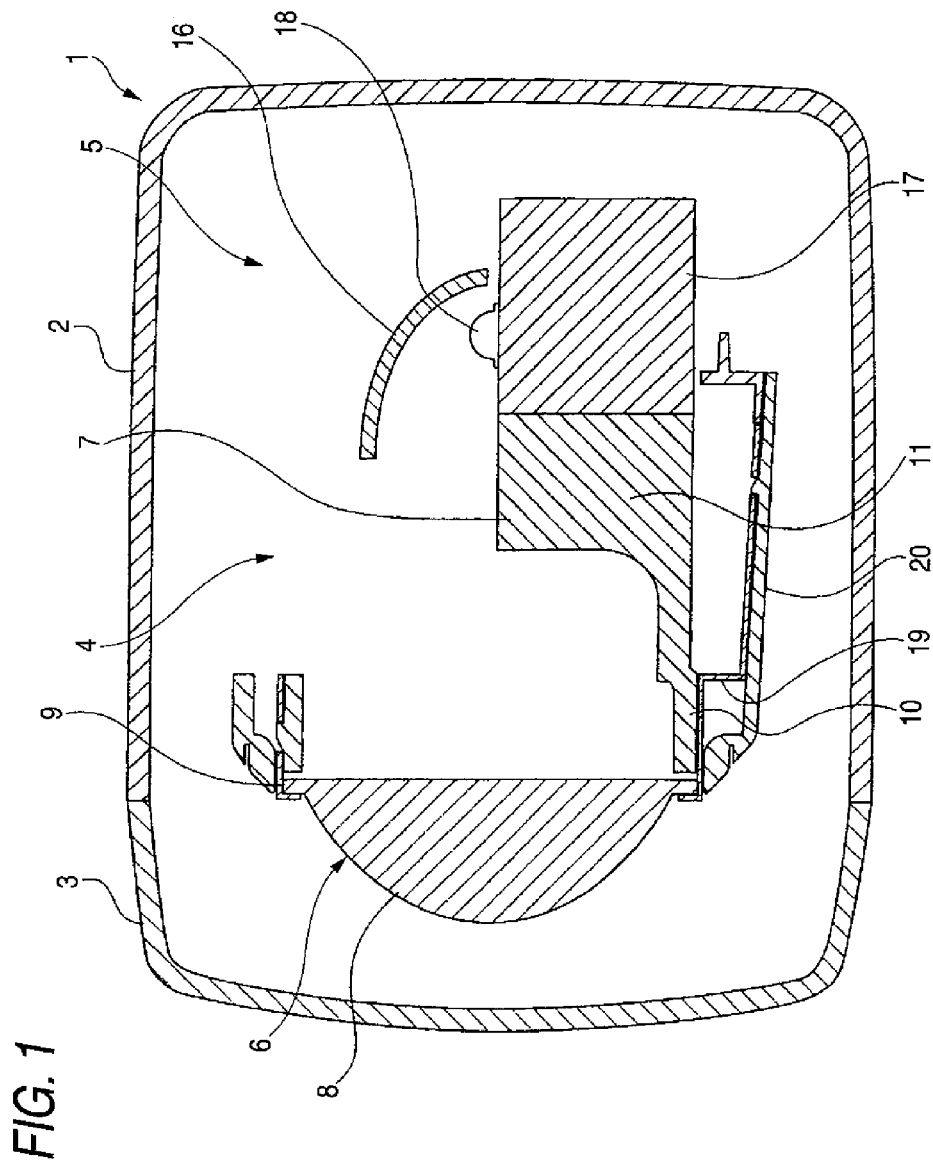
FIG. 1 is a diagram showing, together with FIGS. 2 to 7, a vehicle lamp in accordance with one or more embodiments of the invention.

As is shown in FIG. 1, the vehicle headlamp 1 includes a lamp body 2 having a recess portion which is made to open to the front and a cover 3 adapted to close a front open side of the lamp body 2, and an interior space defined by the lamp body 2 and the cover 3 is made to constitute a lamp chamber 4.

A lamp unit 5 is disposed in the lamp chamber 4. The lamp unit 5 is supported on the lamp body 2 by means of an optical axis adjusting mechanism, not shown, in such a manner as to freely be tilted.

The lamp unit 5 includes a lens 6 and a lens holding member 7 for holding the lens 6.

Figure 2:
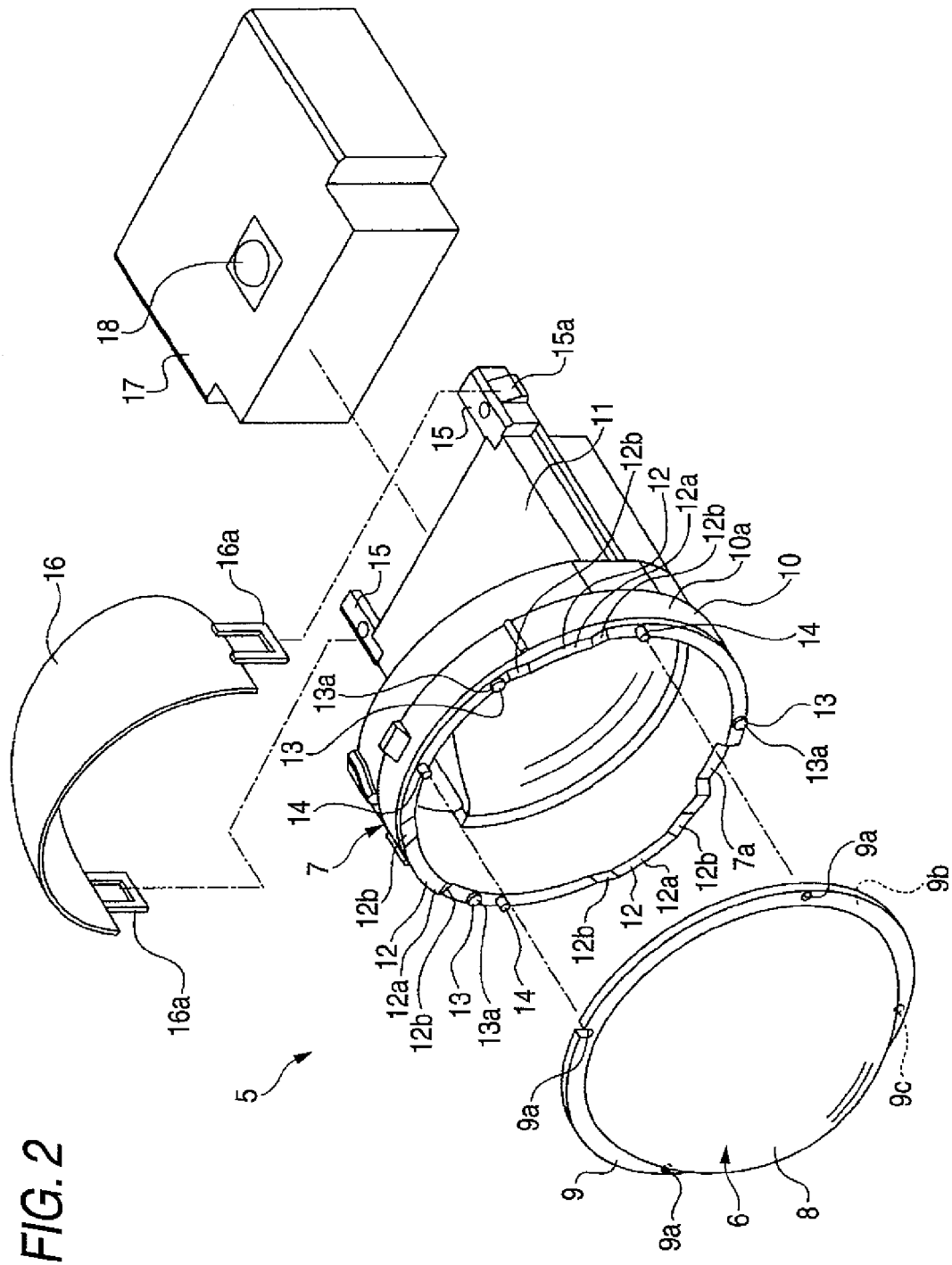
FIG. 2 is a schematic exploded perspective view of a vehicle lamp.

As is shown in FIGS. 1 and 2, the lens 6 is made up of a substantially semi-spherically formed light transmissive portion 8 and a flange-shaped joining portion 9 caused to project outwards from an outer circumferential edge of the light transmissive portion 8. The light transmissive portion 8 and the flange-shaped joining portion 9 are formed integrally from a transparent resin material such as an acrylic resin (a plymethacrylic acid methyl resin) or a polycarbonate resin through injection molding.

A rear side of the lens 6 is formed into a flat surface and, as is shown in FIG. 2, positioning holes (or positioning grooves) 9a, 9a, 9a are formed in the joining portion 9 in such a manner as to pass through the joining portion 9 in a back and forth or longitudinal direction, as well as to be spaced apart from each other in a circumferential direction. A rear side of the joining portion 9 is formed into a joining surface 9b, which is to be joined to the lens holding member 7.

A gate mark 9c, which remains as a mark of a gate which constituted a filling port from which molten resin was poured when the lens 6 was molded, is formed on the joining surface 9b of the joining portion 9.

The lens holding member 7 is made up of a holding portion 10, which is formed into a substantially cylindrical shape, and a shade portion 11, which is formed to continue to a rear end of the holding portion 10. The holding portion 10 and the shape portion 11 are formed integrally from a resin material. In addition, the lens holding member 7 may only have to perform a holding function of holding the lens, and, for example, a housing into which a lens body and a reflector are integrated may be used.

Coloring agents having a laser beam absorbing characteristic such as carbon black and titanium oxide, which is used as a white pigment, are contained in a resin material used to form the lens holding member 7. The lens holding member 7 may be colored, for example, grey by carbon black and titanium oxide.

A front end portion of the holding member 10 is provided as a joining annular portion 10a, and welding portions 12 and stopper portions 13 are provided on a front side of the joining annular portion 10a in such a manner as to project forward therefrom, as well as to be spaced apart from each other in the circumferential direction.

The welding portion 12 has a welding surface 12a, which is oriented to the front, and sloping surfaces 12b, which slope in such a manner as to be displaced to the rear as they extend outwards from circumferential ends of the welding surface 12a. The welding surfaces 12a are positioned on the same plane.

Front surfaces of the stopper portions 13 are formed into stopper surfaces 13a respectively.

Figure 3:
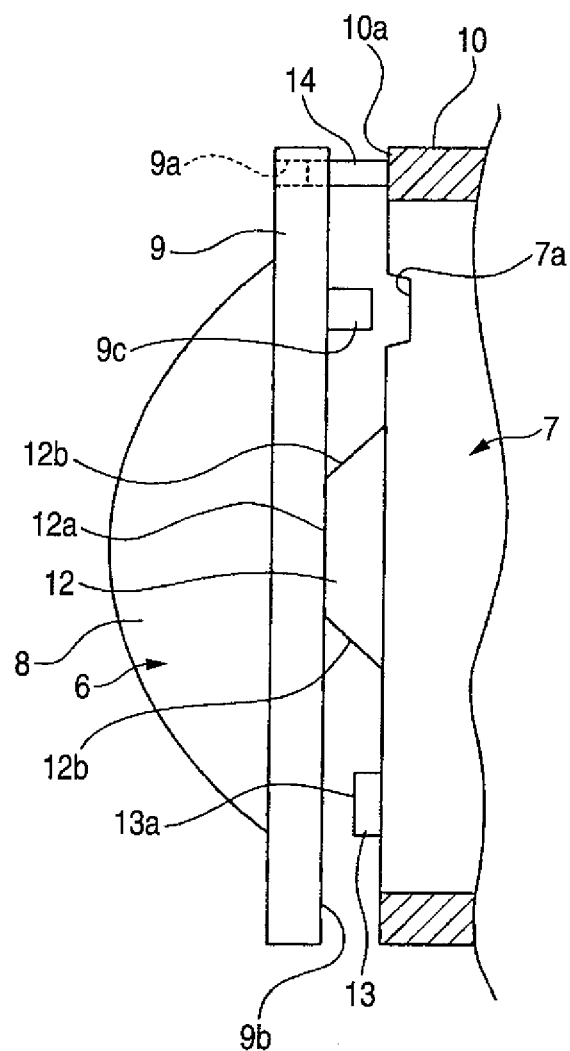
FIG. 3 is an enlarged side view partially cut away to show a section to illustrate a state before a lens and a lens holding member are joined together.

The projection amount of the welding portion 12 to the front is made slightly larger than the projecting amount of the stopper portion 13 to the front and the welding surface 12a is positioned slightly further forward than the stopper surface 13a (distances of the welding surface 12a and the stopper surface 13a over which they project forward are illustrated in an exaggerated fashion in FIG. 3). The longitudinal distances of the welding surface 12a and the stopper surface 13a over which they project forward are made to be distances equal to or less than 1 mm, which are expressed in units of micron.

Positioning pins 14 are provided on the joining annular portion 10a of the holding member 10 in such a manner as to project forwards, the projecting amount of the positioning pins 14 to the front is made larger than the projecting amount of the welding portions 12 to the front.

A recess portion 7a is formed on the front surface of the joining annular portion 10a in such a manner as to open to the front.

Mounting projections 15 are provided on the shade portion 11 in such a manner as to project to the rear, as well as to be spaced apart from each other in a left and right or transverse direction (refer to FIG. 2). Engagement claws 15a are provided on the mounting projections 15, respectively.

A reflector 16 is mounted on the mounting projections 15 of the shade portion 11. Framed-shaped engagement pieces 16a are provided on the reflector 16 in such a manner as to be spaced apart from each other in the transverse direction, and the reflector 16 is mounted on the mounting projections 15 by the engagement pieces 16a being brought into engagement with the engagement claws 15a.

A light source holding member 17 is mounted on a rear side of the lens holding member 7. A light source 18 is held on an upper surface of the light source holding member 17. For example, a light emitting diode may be used as the light source 18.

The lens 6 is mounted on the joining annular portion 10*a* of the lens holding member 7, and is held by the joining portion 9 being held by a lens holder 19 (refer to FIG. 1). A hood 20 is mounted on an outer circumferential surface of the lens holder 19. The hood 20 has a function as an extension which shields an interior of the lamp unit 5.

Hereinafter, a joining procedure will be described of joining the lens 6 and the lens holding member 7 together (refer to FIGS. 3 to 5).

Firstly, the positioning pins 14 of the lens holding member 7 are inserted, respectively, into the positioning holes (or positioning grooves) 9*a* of the lens, so as to position the lens 6 relative to the lens holding member 7 (referring to FIG. 3). As this occurs, the joining surface 9*b* of the joining portion of the lens 6 is brought into contact with the welding surfaces 12*a* of the welding portions 12 of the lens holding member 7. The gate mark 9*c* on the lens 6 is position in front of the recess portion 7*a* of the lens holding member 7.

Figure 4:
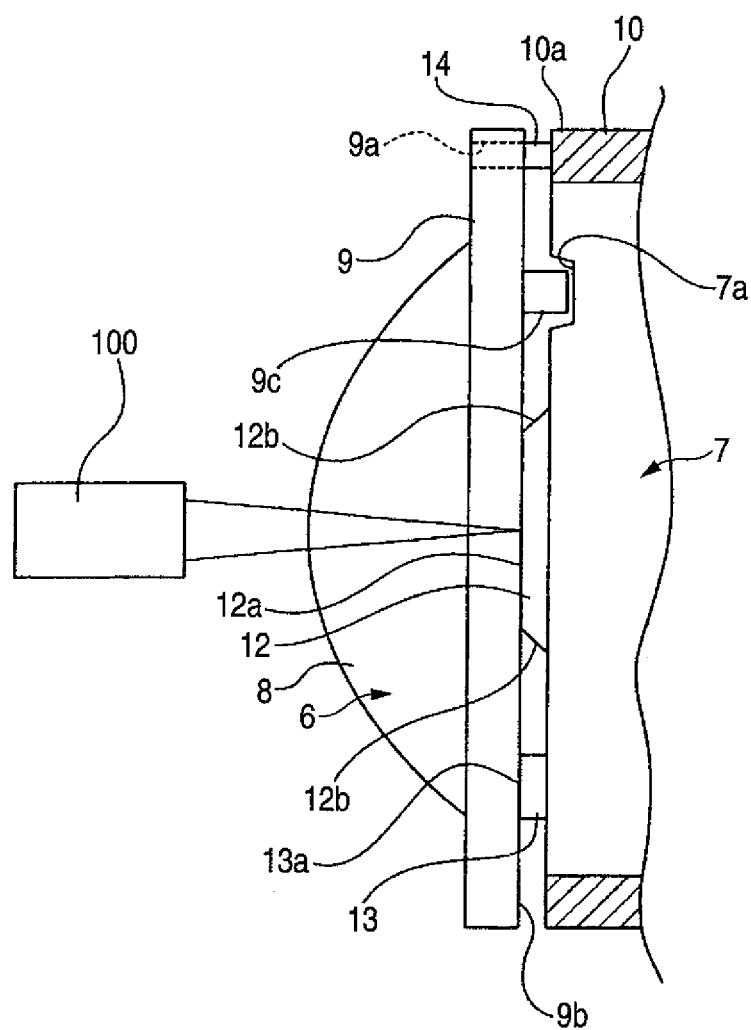
FIG. 4 is an enlarged side view partially cut away to show a section to illustrate a state in which the lens and the lens holding member are joined together.
Figure 5:
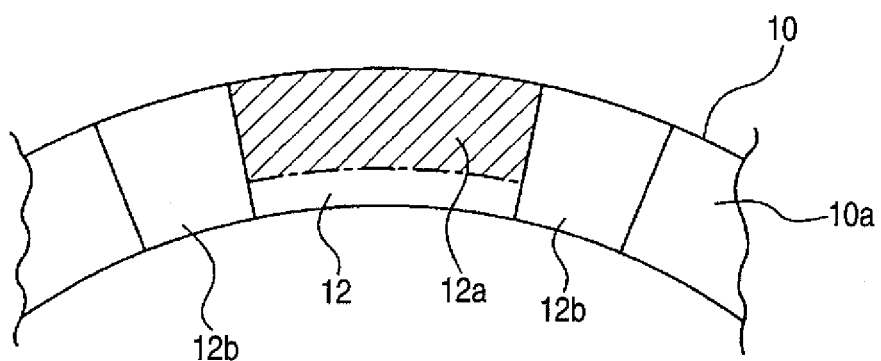
FIG. 5 is a conceptual diagram showing a laser beam shining range relative to a welding surface.

Next, a laser beam is emitted onto the welding surfaces 12*a* of the lens 6 from a laser emitter 100 (referring to FIG. 4). The laser beam passes through the joining portion 9 of the lens 6 to be shone onto the welding surfaces 12*a*. Although the laser beam is shone onto the welding surfaces 12*a* in such a manner as to be scanned thereover, a laser beam shining range on the welding surfaces 12*a* is not the whole of the welding surfaces 12*a*, but a portion of the welding surfaces 12*a* excluding at least part of a circumferential portion thereof for example, a range excluding an inner circumferential side of the welding portions 12 (the laser beam shining range is shown hatched in FIG. 5).

In this way, by setting the laser beam shining range to a range which excludes at least part of the outer circumferential portion of the welding surfaces 12*a*, unnecessary melting of the lens holding member 7 and the lens 6 can be prevented. For example, in the event that the laser beam is shone to the inner side portion of the welding surfaces 12*a*, a scorched mark is produced on an inner surface of the lens holding member 7 or an inner surface of the lens 6 by heat conducted thereto or gas produced by high temperature based on melting of the portions of the lens holding member 7 and the lens 6 onto which the laser beam is shone is caused to adhere to the inner surfaces of the lens holding member 7 and the lens 6, leading to the external appearance of the lamp being deteriorated or the light distribution of the lens 6 being negatively affected. On the contrary, however, by shining the laser beam on to the welding surfaces 12*a* over a range which excludes the inner circumferential side thereof, the generation of these drawbacks can be prevented, i.e., the scorching or adhesion of gas is produced by the unnecessary melting of the lens holding member 7 and the lens 6 can be prevented.

In addition, the laser beam shining range is not limited to a range which excludes the portion on the inner circumferential side of the welding surfaces 12*a*, and hence, the laser beam shining range may be a range which excludes portions on the outer and inner circumferential sides of the welding surfaces 12*a* or a range which excludes the whole outer circumferential portion of the welding surfaces 12*a*. When the laser beam is shone onto the welding surfaces 12*a*, the welding portions 12 is heated to be melted, and a portion on the joining portion 9 of the lens 6 which is in contact with the welding surfaces 12*a* is also heated to be melted by virtue of conduction of heat from the welding surfaces 12*a*, whereby the welding surfaces 12*a* and the joining surface 9*b* are both melted to be joined together. As this occurs, as has been described above, although the laser beam is shone onto the welding surfaces 12*a* excluding part thereof, not only the portion to which the laser beam is shone, but also, the whole of the welding surfaces 12*a* is melded by heat conducted, so that the whole of the welding surfaces 12*a* is joined to the joining surface 9*b*.

Although carbon black, which has the characteristic of absorbing a laser beam, is contained in the lens holding member 7, because no light absorbing agent which absorbs a laser beam is contained in the lens 6, the absorption of the laser beam shone in the lens 6 before the laser beam has reached the lens holding member 7 is prevented. Thus, a high laser beam absorbing rate can be secured on the welding surfaces 12*a*, which are formed as the joining surfaces.

In addition, although titanium oxide is contained in the lens holding member 7 in addition to carbon black as has been described above, because titanium oxide has a laser beam reflecting (dispersing) function, for example, even in the event that carbon black is locally aggregated, the laser beam is dispersed by the titanium oxide contained in the aggregated portions, a local excessive melting of the welding portions 12 by the laser beam can be prevented.

Additionally, because the portions of the welding portions 12 of the lens holding member 7, which continue to the welding surfaces 12*a*, are formed into the sloping surfaces 12*b*, 12*b*, even in the event that the shining position of the laser beam is slightly deviated from the welding surfaces 12*a* whereby the laser beam is shone onto the sloping surfaces 12*b*, because a diameter of a spot formed on the welding portion 12 when the laser beam is shone onto the welding portions 12 does not change greatly compared to a diameter of a spot formed on the sloping surface 12*b*, a change in the amount of heat that is allowed to enter the welding portions 12 by the laser beam is small, thereby making it possible to melt the welding portions 12 properly.

When the welding surface 12*a* and the joining surface 9*b* are heated to be melted, the lens 6 sinks towards the lens holding member 7 side by such an extent that the welding surface 12*a* and the joining surface 9 are so melted. As this occurs, because the stopper portions 13 are provided on the lens holding member 7, the lens 6 sinks towards the lens holding member 7 side to a position where the joining surface 9*b* is brought into contact with the stopper surfaces 13*a*.

Following this, the emission of the laser beam is stopped, and the lens 6 and the lens holding member 7 are cooled down, whereby the welding portions 12 and the joining portion 9 are set and the lens 6 and the lens holding member 7 are joined together.

When shining the laser beam onto the welding portions 12 in the way described above, the same number of laser emitters 100 as that of the welding portions 12 may be used so that laser beams are shone onto the welding portions 12 simultaneously by the respective laser emitters 100. As this occurs, a reduction in the working time in the joining operation can be realized.

Figure 6:
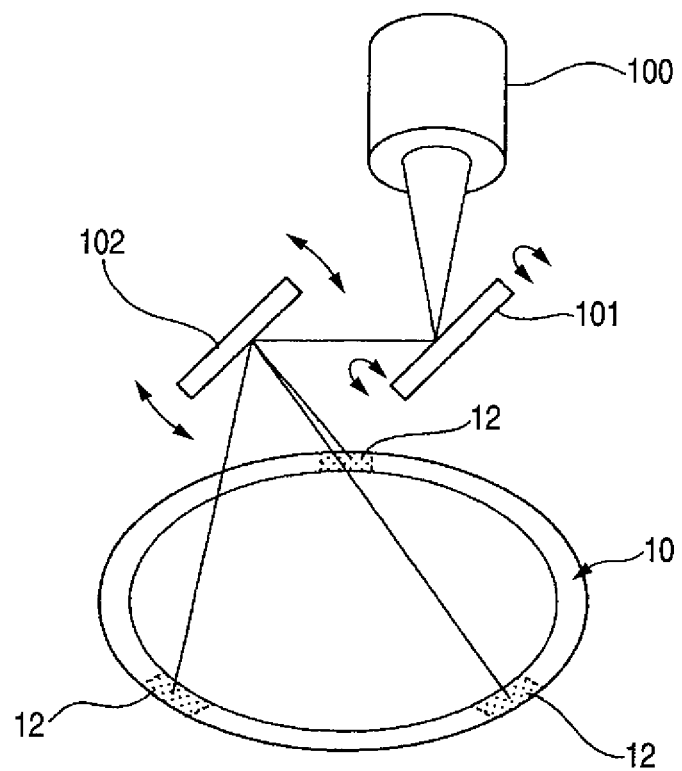
FIG. 6 is a conceptual diagram showing a state in which welding is performed using galvanometer mirrors.

In addition, as is shown in FIG. 6, a laser beam is emitted intermittently from a single laser emitter using a galvanometer mirror 101 and a galvanometer mirror 102, which reflect the laser beam from the laser emitter 100, and the laser beam can be shone onto the welding portions 12 by rotating the galvanometer mirror 102. In this case, an increase in the accuracy of the shining position of the laser beam with respect to the welding surfaces 12*a* can be realized.

Thus, as has been described above, in the vehicle headlamp 1, the plurality of welding portions 12 and the plurality of stoppers 13 are provided on the joining annular portion 10*a* of the lens holding member 7 in such a manner as to project towards the lens 6 side, as well as to be spaced apart from each other in the circumferential direction.

Consequently, since only the welding portions 12 are welded so that the lens 6 and the lens holding member 7 are joined together, the working time in the laser welding operation can be shortened.

In addition, because the lens 6 and the lens holding member 7 are joined together in such a state that the lens 6 sinks towards the lens holding member 7 side to be brought into contact with the stopper portions 13, an increase in the positioning accuracy between the lens 6 and the lens holding member 7 can be realized.

In a vehicle lamp in which the outside diameter of a lens is small, because a distance between a shade and the lens is short, a high positioning accuracy of a lens holding member with respect to the lens is required in forming a light distribution pattern. In the event that the vehicle headlamp 1 is such that the outside diameter of the lens is small, the configuration is especially effective when welding is started in such a state that the lens 6 is not in contact with the stopper portions 13 and, after the welding, the joining portion 9 is brought into contact with the stopper portions 13 so that the lens 6 and the lens holding member 7 are joined together to thereby increase the positioning accuracy between the lens 6 and the lens holding member 7.

Furthermore, because the welding portions 12 and the stopper portions 13 are provided alternately and spaced apart from each other in the circumferential direction, the positioning accuracy between the lens 6 and the lens holding member 7 in the circumferential direction can be increased, thereby making it possible to secure a good light distribution pattern of light emitted from the light source 18.

In addition, although the gate mark 9 on the lens 6 is positioned in front of the joining annular portion 10a of the lens holding member 7 in such a state that the lens 6 and the lens holding member 7 are joined together, because the gate mark 9c is positioned in front of the recess portion 7a formed on the joining annular portion 10a, the contact of the gate mark 9c with the joining annular portion 10a can be prevented, thereby making it possible to secure a good positioning accuracy between the lens 6 and the lens holding member 7.

Note that in general, due to a relatively large internal stress remaining in the gate mark, strain tends to be generated easily, and hence, the gate mark has a characteristic that when the temperature inside the lamp rises, the gate mark or gate mark formed portion of the lens 6 is easily deformed even at a temperature which is lower than an upper limit melting temperature of the whole of the lens 6. Consequently, there may occur a case where a thermal treatment referred to as an annealing treatment needs to be applied to the gate mark in order to eliminate the strain so generated. However, when applying such an annealing treatment, there are caused drawbacks that the lens working time is extended by such an extent that the treatment in question is performed and that exclusive heat treatment application equipment is necessary.

Figure 7:
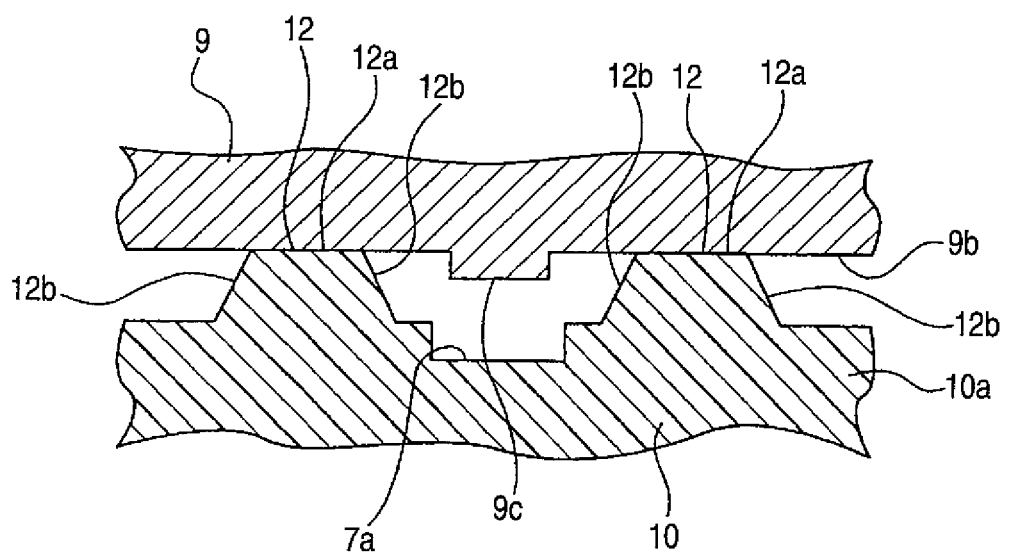
FIG. 7 is an enlarged sectional view showing an example in which welding portions are provided in the vicinity of both sides a gate mark.

To cope with these drawbacks, as is shown in FIG. 7, a configuration may be adopted in which the lens molding member 7 is formed such that welding portions 12 are positioned in the vicinity of both sides of the gate mark 9c, so that laser welding is also implemented on the welding portions 12. By shining the laser beam onto the welding portions 12 which are positioned in the vicinity of both the sides of the gate mark 9c in the way described above, because the gate mark 9c is drawn by the welding portions 12 lying on both the sides of the gate mark 9c which are so welded, the deformation of the gate mark 9c can be prevented which would otherwise be caused when the temperature within the lamp rises. Consequently, no annealing treatment needs to be implemented on the gate mark 9c, a rise in productivity of vehicle headlamps 1 can be realized by shortening the working time on the lens 6.

While in the embodiments described above, the vehicle headlamp 1 is described in which the reflector 16 is configured to be mounted on the lens holding member 7 as a separate member, for example, a vapor deposition treatment may be applied onto the inner surface of the lens holding member using a material having a high reflection factor such as aluminum or silver so as to form a reflector portion thereon, so that the lens holding member can be formed into a member having two functions of the reflector and the lens holding member for holding the lens 6. In this case, a reduction in the number of components and a reduction in the number of assembling steps in production can be realized.

Minute waveform irregularities are formed on the rear side of the lens 6 excluding the joining portion 9 in such a manner as to extend in a horizontal direction with a view to suppressing chromatic aberration and blurring the cut-line, and the rear side of the joining portion 9 is formed into the flat plane. In the case of the lens 6 having the minute irregularities, because a high positioning accuracy of the lens 6 with respect to the light source 18 is required in forming a light distribution pattern, a high positioning accuracy of the lens 6 with respect to the lens holding member 7 on which the light source holding member 17 for holding the light source 18 is also required.

With the lens 6, however, as has been described above, because the rear side of the joining portion 9 is formed into the flat plane, the whole of the welding surfaces 12a of the welding portions 12 and the joining portion 9 are brought into surface contact with each other. Consequently, because a good joining performance between the lens 6 and the lens holding member 7 is secured, an accurate control is enabled to be implemented from the light source 18 to the focal distance of the lens 6, thereby making it possible to secure the high positioning accuracy between the lens 6 having the minute irregularities and the lens holding member 7.

In the vehicle headlamp 1, as has been described above, although the joining portion 9 of the lens 6 is partially joined to the lens holding member 7 through laser welding, a sufficient joining strength is required to prevent the dislocation of the lens 6 from the lens holding member 7 due to a load expected to be applied from the outside. With a view to securing such a sufficient joining strength, a welding area can be determined by the following expression in consideration of a load that is expected to be so applied and the mass of the lens 6.

Welding Area=(a tensile load or shearing load that is expected to be applied×the mass of the lens× safety factor)/(a joining strength required in design)

For the tensile load or shearing load, a larger load than expected to occur is selected and, for example, two is selected as the safety factor. Because the welding area so calculated is a total area of the welding surfaces, a welding surface of the single welding surface should be a value resulting by dividing the calculated welding area by the number of welding surfaces.

In addition, in the above embodiment, while the three welding portions 12 and the three stopper portions 13 are described as being provided on the lens holding member 7, the numbers of welding portions 12 and stopper portions 13 should not be limited to three for each of the welding portions 12 and the stopper portions 13, and hence, an arbitrary number may be adopted for each, provided that the number is plural.

While there has been described in connection with the exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

DESCRIPTION OF REFERENCE NUMERALS 1 vehicle headlamp; 6 lens; 7 lens holding member; 7a recess portion; 9c gate mark; 10a joining annular portion; 12 welding portion; 12a welding surface; 13 stopper portion

What is claimed is:

1. A vehicle lamp comprising:
    a lens formed from a resin material; and
    a lens holding member for holding the lens formed from the resin material,
    wherein the lens and the lens holding member are adapted to be joined together through laser welding,
    wherein a joining annular portion is provided on the lens holding member to which an outer circumferential portion of the lens is joined, and
    wherein a plurality of welding portions and a plurality of stopper portions are provided on the joining annular portion,
    wherein the plurality of welding portions project towards the lens, have a first height before laser welding, and are positioned apart from each other in a circumferential direction,
    wherein the plurality of stopper portions project towards the lens, have a second height that is less than the first height, are positioned apart from each other in the circumferential direction, and contact an outer circumferential portion of the lens when the lens is joined to the joining annular portion, and
    wherein, after laser welding, the plurality of welding portions have the second height.

2. A vehicle lamp as set forth in claim 1, wherein the welding portions and the stopper portions are provided alternately and spaced apart from each other in the circumferential direction.

3. A vehicle lamp as set forth in claim 1,
    wherein welding surfaces are formed on the welding portions of the lens holding member in such a manner as to face the lens so as to be joined to the lens, and
    wherein a laser beam is shone onto the welding portions excluding at least part of circumferential portions thereof.

4. A vehicle lamp as set forth in claim 1, wherein a recess portion is formed on a side of the joining annular portion which faces a gate mark of the lens.

5. A vehicle lamp as set forth in claim 4, wherein welding portions are provided, respectively, near positions lying on both sides of the recess in a circumferential direction of the joining annular portion.

6. The vehicle lamp as set forth in claim 2,
    wherein welding surfaces are formed on the welding portions of the lens holding member in such a manner as to face the lens so as to be joined to the lens, and
    wherein a laser beam is shone onto the welding portions excluding at least part of circumferential portions thereof.

7. The vehicle lamp as set forth in claim 2, wherein a recess portion is formed on a side of the joining annular portion which faces a gate mark of the lens.

8. The vehicle lamp as set forth in claim 3, wherein a recess portion is formed on a side of the joining annular portion which faces a gate mark of the lens.

9. The vehicle lamp as set forth in claim 4, wherein an annealing treatment is applied to the gate mark.

10. The vehicle lamp as set forth in claim 1 further comprising:
    a reflector configured to be mounted on the lens holding member.

11. The vehicle lamp as set forth in claim 1, wherein a vapor deposition treatment is applied onto an inner surface of the lens holding member using a material having a high reflection factor so as to form a reflector portion thereon.

12. A vehicle lamp comprising:
    a lens; and
    a lens holding member adapted to be joined to the lens through laser welding, the lens holding member comprising:
    a joining annular portion to which an outer circumferential portion of the lens is joined, and
    a plurality of welding portions on the joining annular portion that project towards the lens, have a first height before laser welding, and are positioned apart from each other in a circumferential direction,
    a plurality of stopper portions provided on the joining annular portion that project towards the lens, have a second height that is less than the first height, are positioned apart from each other in the circumferential direction, and contact an outer circumferential portion of the lens when the lens is joined to the joining annular portion, and
    wherein, after laser welding, the plurality of welding portions have the second height.

13. The vehicle lamp as set forth in claim 12, wherein the welding portions and the stopper portions are provided alternately and spaced apart from each other in a circumferential direction.

14. The vehicle lamp as set forth in claim 12,
    wherein welding surfaces are formed on the welding portions of the lens holding member in such a manner as to face the lens so as to be joined to the lens, and
    wherein a laser beam is shone onto the welding portions excluding at least part of circumferential portions thereof.

15. The vehicle lamp as set forth in claim 12, wherein a recess portion is formed on a side of the joining annular portion which faces a gate mark of the lens.

16. The vehicle lamp as set forth in claim 15, wherein welding portions are provided, respectively, near positions lying on both sides of the recess in a circumferential direction of the joining annular portion.

17. The vehicle lamp as set forth in claim 15, wherein an annealing treatment is applied to the gate mark of the lens.

18. The vehicle lamp as set forth in claim 15, wherein the lens is formed of a resin material.

19. The vehicle lamp as set forth in claim 12 further comprising:
    a reflector configured to be mounted on the lens holding member.

20. The vehicle lamp as set forth in claim 12, wherein a vapor deposition treatment is applied onto an inner surface of the lens holding member using a material having a high reflection factor so as to form a reflector portion thereon.

* * * * *